April 9, 1968  S. J. POPEIL  3,376,910
FOOD PROCESSOR
Filed Nov. 26, 1965  5 Sheets-Sheet 1
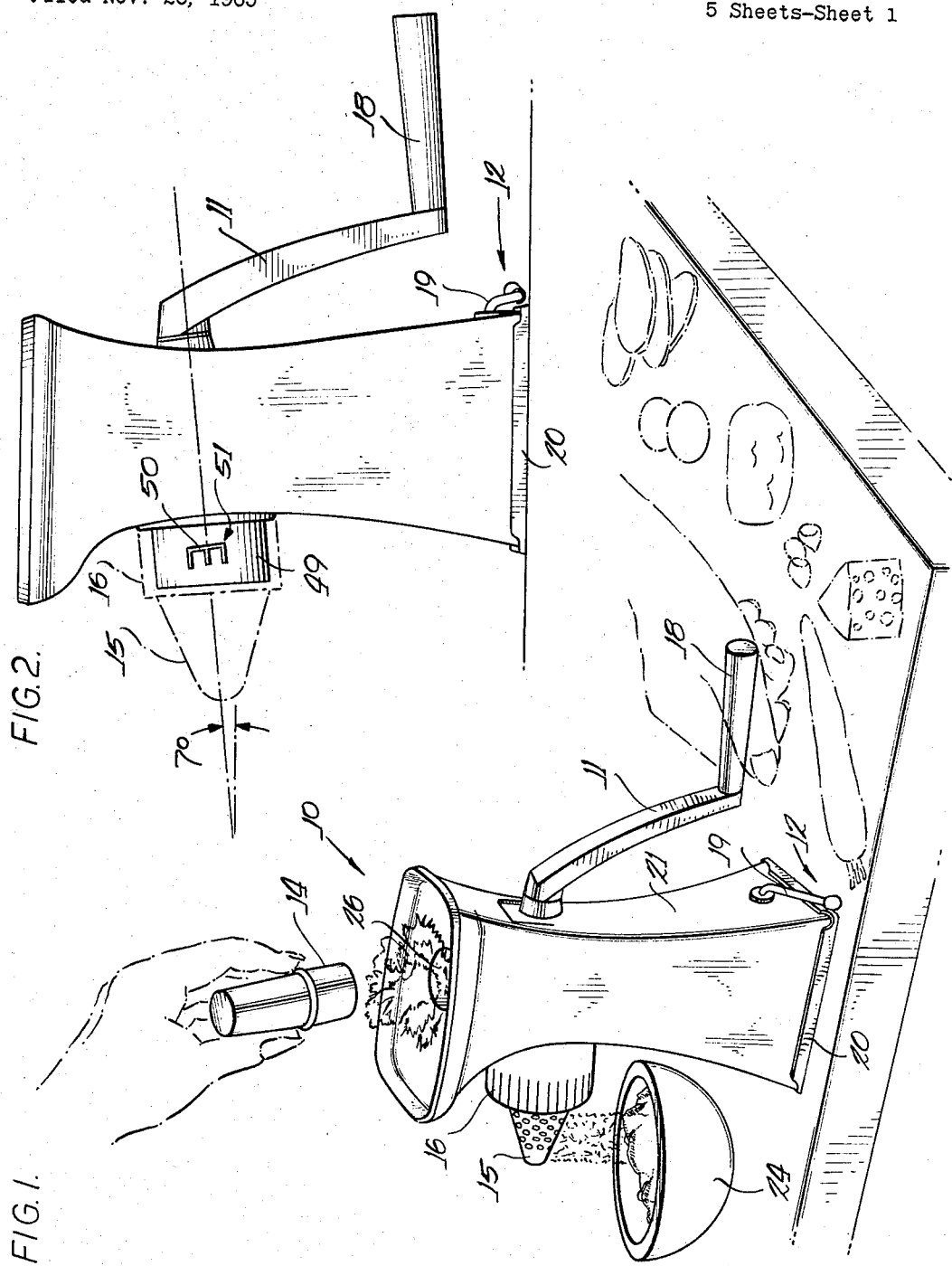
Inventor
Samuel J. Popeil
Dominik & Stein
Attorneys April 9, 1968  S. J. POPEIL  3,376,910
FOOD PROCESSOR
Filed Nov. 26, 1965  5 Sheets-Sheet 2
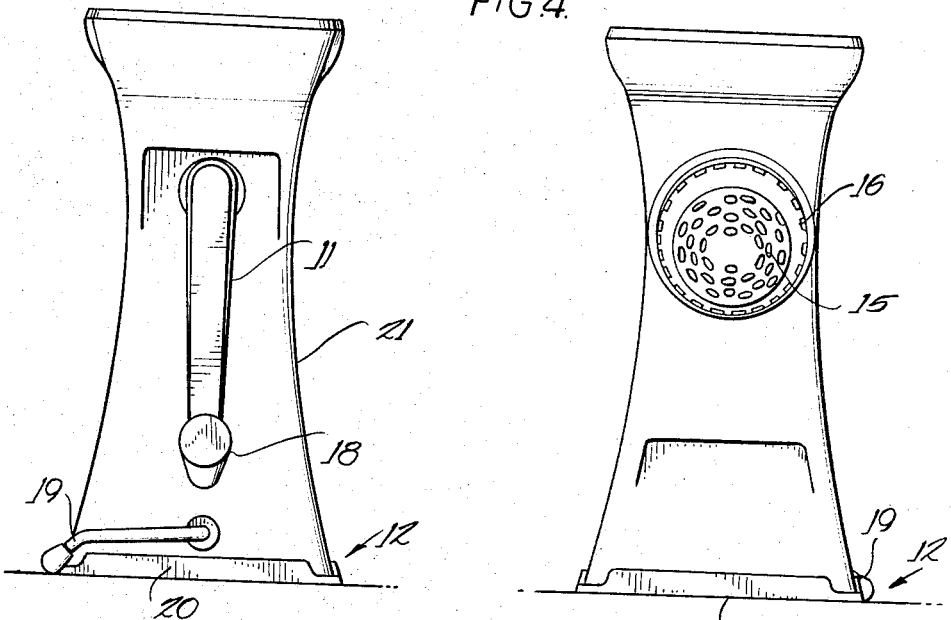
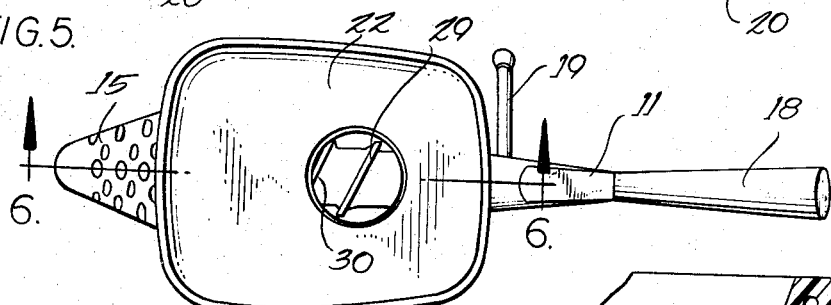
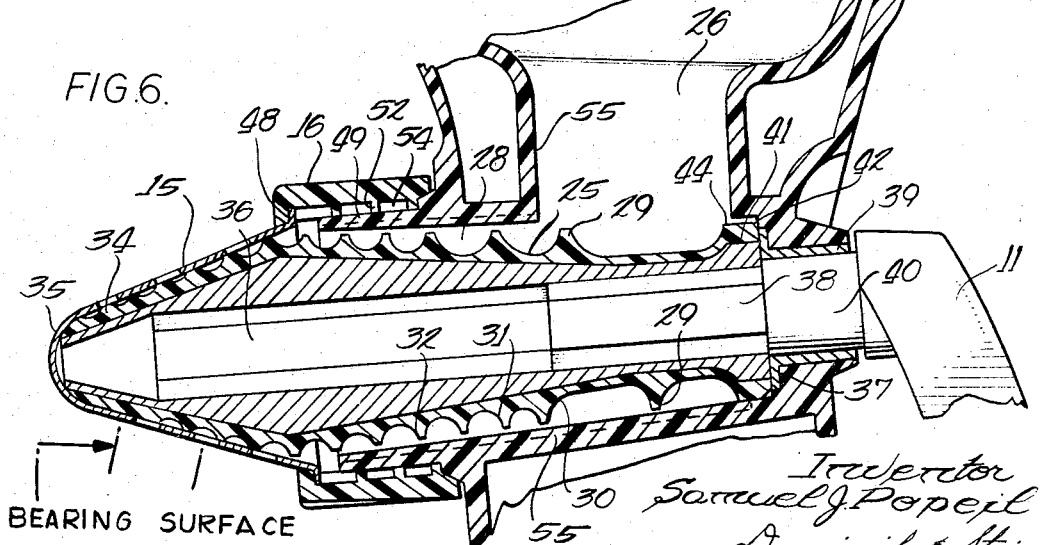
Inventor
Samuel J. Popeil
Dominik & Stein
Attorneys

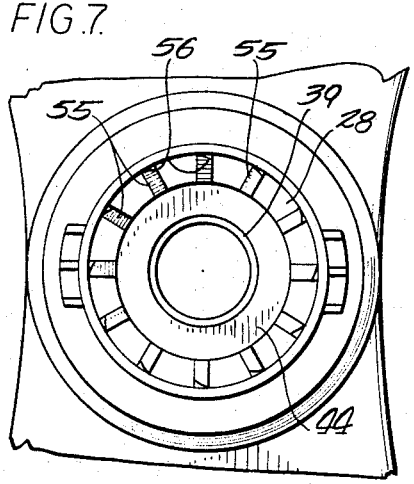
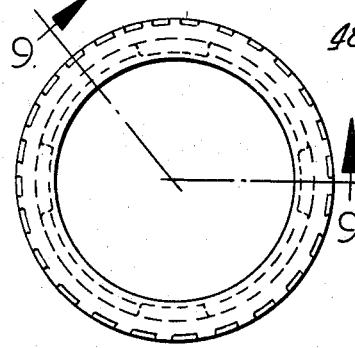
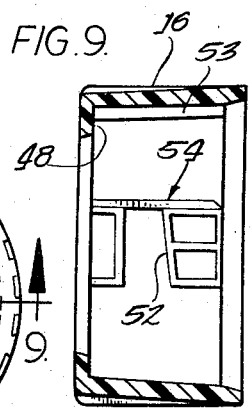
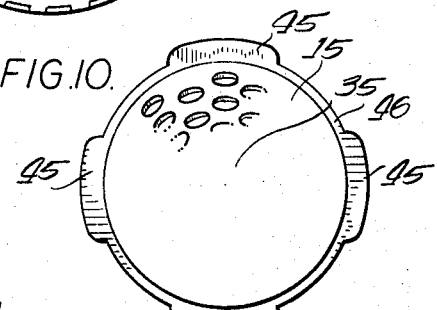
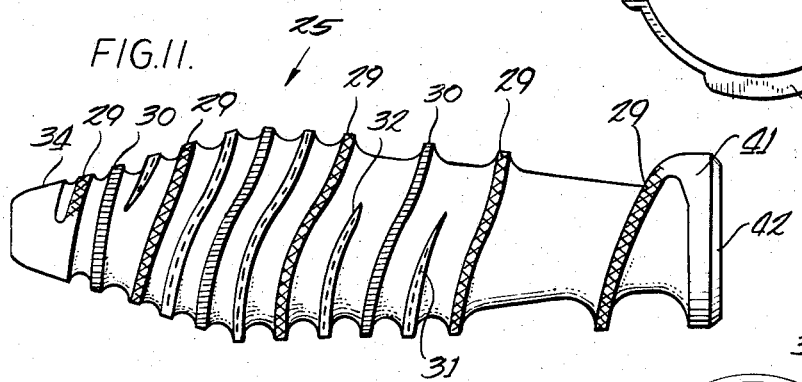
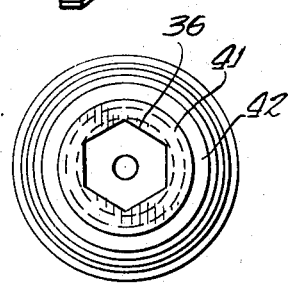
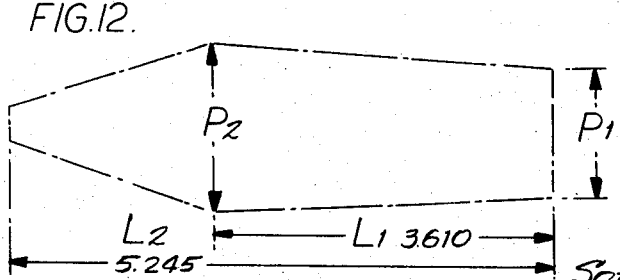

April 9, 1968 S. J. POPEIL 3,376,910
FOOD PROCESSOR
Filed Nov. 26, 1965 5 Sheets-Sheet 4

Inventor
Samuel J Popeil
Dominik & Stein
Attorneys

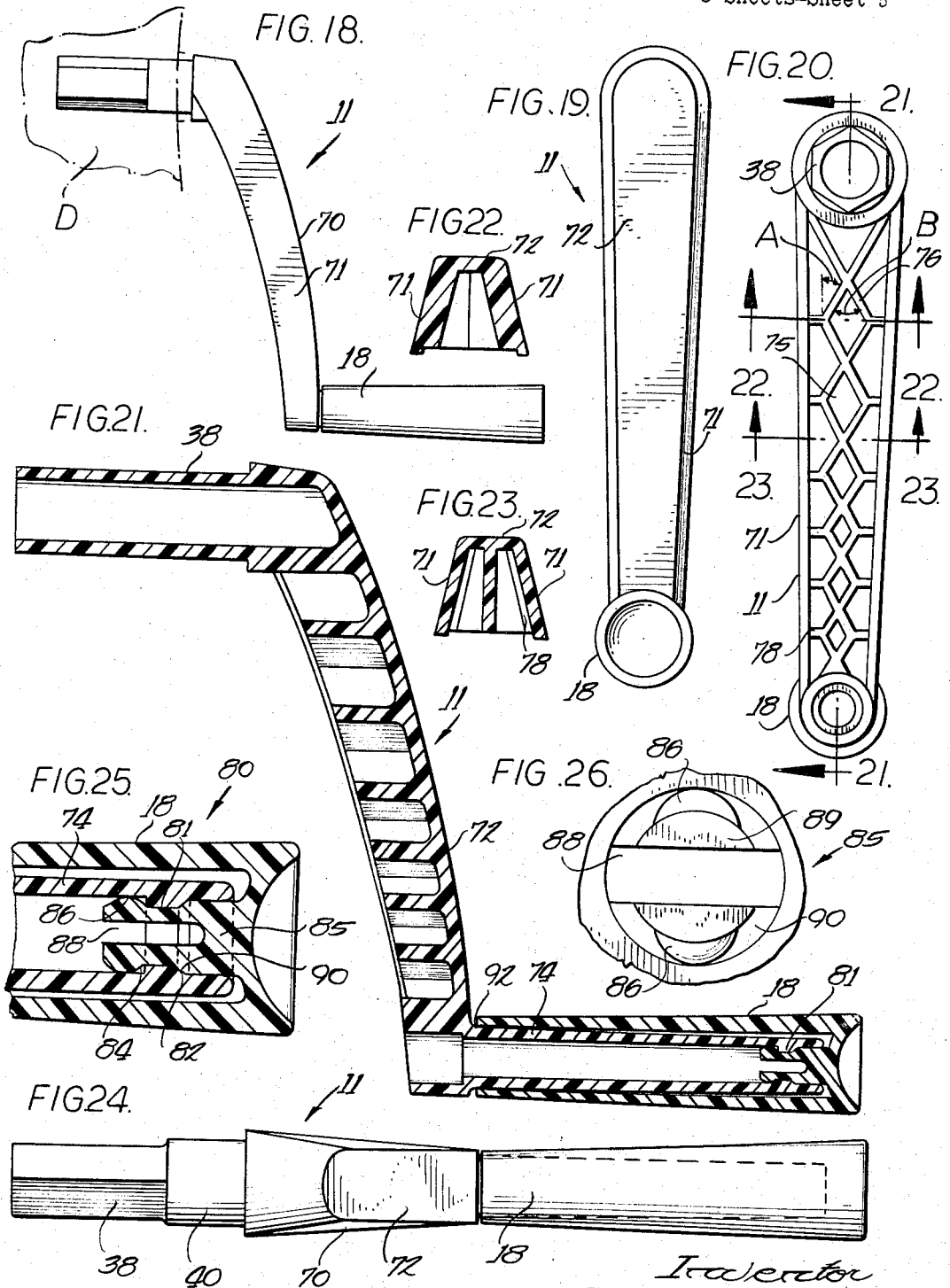

United States Patent Office 3,376,910
Patented Apr. 9, 1968

3,376,910
FOOD PROCESSOR
Samuel J. Popeil, 2920 N. Commonwealth,
Chicago, Ill. 60657
Filed Nov. 26, 1965, Ser. No. 509,695
18 Claims. (Cl. 146—185)

ABSTRACT OF THE DISCLOSURE

A manually operated compact food processor having a screw auger which is provided with an increasing pitch on the screw or auger conveyor adjacent the feed tube. Also, lead threads which assist in achieving a high degree of comminution by the co-operation of the screw threads and longitudinal cutting ribs within the auger chamber of the food processor are provided. A Gothic thread form with an increasing pitch diameter in the auger chamber is provided to assist in assuring comminution and minimizing compaction.

---

The present invention relates to a food processor, and more particularly to a manually operated compact food processor which by a combined action of a rotatable auger and nose cone is enabled to process both raw and cooked foodstuffs (except raw meat) to achieve uniformity of results with a wide variety of ingredients. This food processor is not a grinder.

In the past a wide variety of manually operated screw type devices have been employed basically as raw meat grinders. The subject food processor is not a raw meat grinder, and indeed, is generally unsuited for the processing of raw meat. Raw meat, being plastic in nature, is invariably processed for grinding by using a single screw with a decreasing pitch (distance between adjacent helical flights in the direction of feed) to compress the meat, and thereafter, feed the same into rotating cutting blades. In some instances, the faces are planar in which the cutting blades operate, and in other instances frustoconical. Uniformly, however, they proceed on the principles of compressing the meat before the same is discharged from the grinder. As will be set forth in greater detail hereinafter, the present invention stems from the discovery that the very opposite is required to satisfactorily process foodstuffs other than raw meat. The screw auger in the food processor of the present invention is provided with an increasing pitch on the screw or auger conveyor adjacent the feed tube. An additional and closely related feature of the food processor of the present invention is to simultaneously provide with the increasing of the pitch, and related acceleration of the food particles, additional lead threads to assist in achieving a high degree of comminution by the cooperation of the screw threads and the longitudinal cutting ribs within the auger chamber of the food processor. A further feature of the present invention is the use of a Gothic thread form with an increasing pitch diameter in the auger chamber to assist in insuring comminution and minimizing compaction.

As a result of the foregoing, the food processor can perform the functions of at least seven different devices. For example, it can function as a mincer in mincing foodstuffs such as fresh parsley, without crushing them, for garnishing and otherwise decorating foodstuffs. As a chopper, it will prepare raw carrots for use in a health salad. As a grater, with either hard or medium-hard cheeses, an excellent Parmesian cheese for sprinkling and garnishing, or other cheeses for sandwich spreads and the like can be prepared. Also raw potatoes for potato pancakes, or lemon or orange rind for baking and frosting may be similarly grated. As a blender, cream cheese and olives or other combinations of ingredients can be variously mixed, to prepare potato chip dips, and unusual spreads for sandwiches. The food processor serves as an excellent orange juicer. When employed with graham crackers, dried bread, or even soda crackers, the subject food processor serves as a crumber and will make uniform graham cracker or broken bits and pieces. From start to finish in the crumbing process, a remarkable degree of uniformity is maintained. Finally, as a food mill the food processor will make applesauce, or baby foods from virtually any previously cooked or warmed-over foodstuffs. Boiled potatoes and the like can be riced into a uniform, smooth texture. Similarly, dried fruits such as prunes and apricots, cooked or uncooked, may be riced for pastry mixes and baking. With equal facility the subject food processor chops raw onions.

Inherent in the operation of the subject food processor is a lack of mashing or crushing action. On the contrary, the initial treatment of the food is to provide for an ingestion into the comminuting area of the device, and then subsequently to shearingly extrude the initially comminuted elements in the nose cone to achieve a uniform end product. These steps are performed while accelerating the food flow through the auger to reduce or eliminate compacting or crushing of the food.

As indicated above, the prior art meat grinders utilize a rotating blade mechanism with a single decreasing pitch (along the feed axis) screw construction and shear such as shown in Woodruff United States Patent 374,568. As a result, they lack utility in the preparation of raw vegetables and fruits and actually will mash them. (See also Woodruff Patents 352,023 and 368,041.) Tapered nose cones with an extrusion action and compaction screw threads are shown in Woodruff Patent 443,590 and Warner Patent 754,249. From the dates of these patents, as well as the Brown Patent 591,323 at the turn of the century, it becomes apparent that this general art is exceedingly old. It is therefore, surprising that very few such devices are currently in vogue or employed in the kitchen.

This commercial apathy is believed to stem from the fact that in the past devices cast from metal at considerable expense were developed primarily for the grinding of raw meat. Little attention has been paid to the development of a food processor which will have an almost universal application as a mincer, chopper, ricer, grater, blender, juicer, or food mill. Even the recent attempt as shown in French Patent 1,370,023 issued May 20, 1963, fails to provide fully for the wide variety of foodstuffs which can be processed by the subject device in that the screw pitch decreases and hence simultaneously decelerates and compacts the foodstuffs.

Furthermore, many of the prior art devices fail to recognize the drainage problem and operating problem with manually operated hand-cranked products when they are attached to a Formica table top and the like. In the food processor of the subject invention, the orientation of the opertaive axis has been angled downwardly and forwardly to assist in effecting more torque at the operating surface and also to properly drain the juices generated by the combined comminuting and shearing action.

In view of the the foregoing, it is the principal purpose of the present invention to provide a food processor which accomplishes the functions of seven separate devices, heretofore separately classified by use, and adaptable for the processing of a wide variety of raw (except raw meat) as well as cooked foodstuffs to achieve a uniform end product.

A further and very important object of the present invention is to construct a food processor which minimizes the operator's turning effort for a given quantity of food, and further renders the effort required relatively uniform throughout an operating cycle.

Still another object of the present invention looks to the provision of a food processor with a wide variety of functions which can be easily disassembled for cleaning and readily reassembled by the average homemaker.

Still another object of the invention results from a construction of a food processor achieving all of the foregoing objects which can be manufactured primarily out of a few plastic moldings thereby rendering it not only light in weight but substantially less expensive than comparable devices which perform fewer of the advantageous functions.

Another more detailed object of the invention is the provision of a food storage input reservoir on the food processor so that a substantial through-put may be obtained by the operator without frequent interruption to refill the input portion with additional foodstuffs.

Another detailed object of the invention looks to the ready changeability of the nose cone portion of the food processor which not only renders the processor adaptable to additional foodstuffs, but further permits selective variety with a given foodstuff. In addition, this quick removal of the principal shearing element assists in cleaning.

An additional and important object of the invention is to provide a suction mounting means so that the food processor can be readily and firmly attached to any flat surface. A related object is to provide a light weight sturdy removable handle for ease in operation, cleaning, and cost reduction.

Further objects and advantages will become apparent as the following description of an illustrative embodiment of the invention proceeds, taken in conjunction with the accompanying drawings in which:

FIG. 1 is a perspective view illustrating in phantom lines the foodstuffs and motive operation of the subject food processor.

FIG. 2 is a front elevation of the food processor showing the general organization of the basic external elements and the angle of axis of operation.

FIG. 3 is an end view of the food processor taken from the right hand portion of FIG. 2.

FIG. 4 is another end view of the food processor taken from the left hand portion of FIG. 2.

FIG. 5 is a top view of the food processor.

FIG. 6 is an enlarged partially broken transverse sectional view of the food processor taken along section line 6—6 of FIG. 5.

FIG. 7 is an enlarged partially broken view of the left hand portion of the food processor as shown in FIG. 6 with the nose cone portion removed.

FIG. 8 is a plan view of the nose cone locking ring showing in dotted lines the principal interior structural elements.

FIG. 9 is an enlarged partially broken transverse view of the nose cone locking ring taken along section line 9—9 of FIG. 8.

FIG. 10 is a plan view of the nose cone portion of the food processor.

FIG. 11 is an enlarged front elevation of the auger portion of the food processor coded to show the various helical flights.

FIG. 12 is a partially diagrammatic view of the auger portion shown in FIG. 11 to illustrate the respective areas and dimensional proportions of the auger.

FIG. 13 is an end view of the auger shown in FIG. 11 taken from the right end portion thereof.

FIG. 18 is a front elevation of the handle construction.

FIG. 19 is an end view of the handle construction shown in FIG. 18 in enlarged scale.

FIG. 20 is a rear view of the handle construction shown in FIG. 19 illustrating the ribbed reinforcing portion.

FIG. 21 is an enlarged longitudinal sectional view of the handle construction shown in FIG. 20 taken along sectional line 21—21 of FIG. 20.

FIG. 22 is a transverse sectional view of the handle construction taken along section line 22—22 of FIG. 20.

FIG. 23 is a transverse sectional view taken along section line 23—23 of FIG. 20.

FIG. 24 is a top view of the handle construction in the same scale as FIG. 21.

FIG. 25 is an enlarged, partially broken, longitudinal sectional view of the handle grip lock assembly.

FIG. 26 is an enlarged partially broken end view of the snap plug construction element of the handle grip lock assembly.

Figure 14:
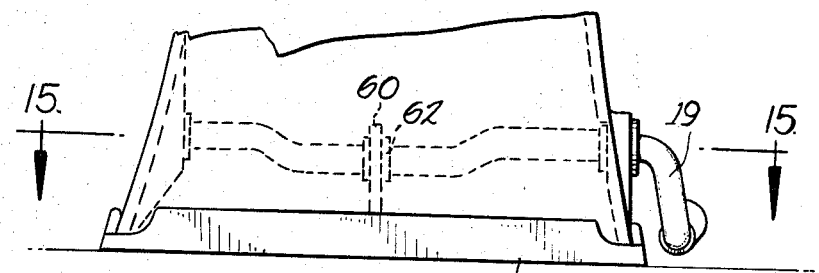
FIG. 14 is a broken enlarged view of the bottom portion of the food processor in the same elevation as FIG. 2 illustrating in phantom lines the interior construction of the bottom lock mechanism.
Figure 15:
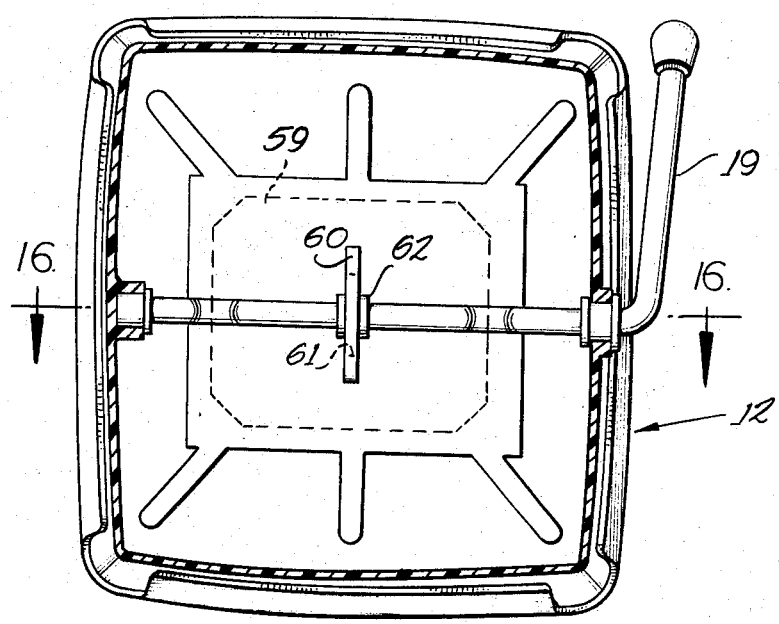
FIG. 15 is a transverse sectional view of the bottom portion of the food processor taken along section line 15—15 of FIG. 14.
Figure 16:
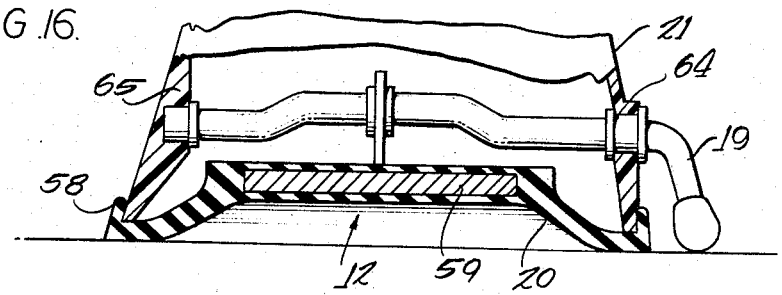
FIG. 16 is a transverse sectional view of the bottom locking portion of the food processor taken along section line 16—16 of FIG. 15.

In operation the food processor 10 as illustrated in FIG. 1 is secured to a Formica table top or other flat surface by means of the base lock 12 which, in turn, is activated by the base lock handle 19. The operator then grasps the handle grip 18 (as shown in phantom lines) and rotates the handle 11. The sturdy body portion 21 secured by means of the base lock 12 to a table top permits a convenient receptacle 24, such as the dish illustrated, to be positioned on the same table top to receive the processed food portions without fear of misalignment. A pusher 14 may be used by the operator in order to assist in accelerating the foodstuffs into the feed tube portion 26 for processing in the subject device. As the handle is turned, and after the foodstuffs are completely ingested into the food processor 10, they begin coming out of the nose cone 15 and dropping into the receptacle 24. After the food processor has completed its chore, the nose cone lock ring 16 is removed and the handle 11 separated from the interior auger 25 (FIG. 6) whereupon the various parts may be readily rinsed and cleaned for storage, and readied for subsequent usage. When the base lock handle 19 is raised, the base lock diaphragm 20 flattens itself against the table top and releases the food processor for removal.

Before proceeding further with the details of the construction of the auger 25 and its intimate operative relationship with the nose cone 15, the feed tube 26 and the interior portion of the auger chamber 28, it will be helpful to appreciate the wide variety of functions performed by the food processor as set forth below under appropriate functional designations:

Minces:
    parsley
    eggs (hard)
    liver (cooked)
    nuts
    olives
    vegetables
    garlic
    clams
    fish or chicken (croquettes)
    pickles (relish)
    mushrooms
    meat (cooked)
    bacon (crisp)
    cranberries (relish)
    corned beef (cooked)
Pulverizes:
    graham crackers (crumbs)
    corn flakes (crumbs)
    bread (crumbs)

Pulverizes—Continued
   potato chips (crumbs)
   spices (dried)
   bouillon cubes
Grates:
   cheese
   horseradish
   orange or lemon peel
   potatoes (pancakes)
   chocolate
   coconut
   carrots, beets, etc.
Blends:
   baby foods
   sandwich spreads
   peanuts (peanut butter)
   dried fruits
   anchovies (paste)
   ingredients for:
      butters
      dips
      soups
      dressings
      gravies
      sauces
Rices:
   potatoes (cooked) white or sweet
Juices:
   citrus fruits
   pineapple
   grapes
   tomatoes
Purees:
   onions
   tomatoes
   fruits (raw or cooked)
   berries (dessert toppings)
   vegetables (cooked)

As pointed out in the objects above, the reason for the wide variety of functions which the food processor 10 can perform stems from the fact that it is not a grinder, and most importantly from the fact that it is constructed to reduce mashing or crushing tendencies to a minimum, and to maximize the comminuting action of the auger 25 and the auger chamber 28 in a coordinated relationship with the shearing action imparted by the nose cone 15. To achieve this end, as will be set forth in greater detail below, the helical flights on the auger 25 have been sequentially arranged both as to number as well as taper. Most importantly, however, an increase in pitch to accelerate the passage of foodstuffs is provided within the auger chamber. In addition, the capacity of the feed tube 26 is coordinated to approximate the projected area of the available discharge of the nose cone 15 to further augment the throughput without crushing or compaction.

Of primary importance to the efficiency achieved by the subject food processing device is the configuration of the auger 25, and more particularly the unique relationship between its helical flights and the auger chamber 28. Referring now to FIG. 11, it will be observed that a first helical flight 29 (cross hatched for identification) is defined at the handle portion of the auger 25 and (as observed in FIG. 5) covers the major portion of the feed tube 26 opening. A second helical flight 30 (horizontally lined for identification) is positioned to begin at some point within the feed tube 26 opening (FIG. 5) and to develop into a full flight internally of the auger chamber 28 (FIG. 6). The third and fourth helical flights 31, 32 (dotted lines for identification) begin within the frustoconical enlarging pitch diameter portion of the auger chamber 28 (as observed in FIG. 6). It should be noted that the pitch of the first helical flight 29 is increased by about 25% in the auger chamber 28. This, of course, requires a similar increase in pitch of the second, third, and fourth helical flights 31, 31, 32.

As will be noted in FIG. 6, the flights of helical members begin to terminate in the nose cone bearing portion 34 of the auger 25. The imperforate end portion 35 of the nose cone 15 is proportioned to snugly engage the nose cone bearing portion 34 of the auger 25. The volumetric relationship between the cross-sectional area of the feed tube 26, the capacity of the helical portion of the auger 25, and the projected area of the perforations in the nose cone 15 importantly relate to the overall efficiency and effectiveness of the food processor 10. These ratios will be discussed in greater detail after completing the description of the basic structural elements of the food processor.

As will be further noted in FIG. 13, the auger 25 has a hollow hexagonal central portion 36. A mating hexagonal connecting shaft 38 (FIG. 20) of the handle 11 snugly fits within the hexagonal central portion 36 of the auger and imparts the rotational action of the handle to the auger. Between the handle 11 and the hexagonal connecting shaft 38 is a circular bearing portion 40 (FIGS. 6 and 24) which rotates in a nylon handle bushing 39 inserted within the body of the food processor 10. A thrust flange 37 of the bearing 39 engages an auger guide collar 41 to prevent galling and to reduce friction. The chamfered end 42 of the guide collar 41 is provided primarily to prevent clogging and to permit a certain amount of play between the guide collar 41 and the guide collar recess 44 within the body 21 of the food processor 10.

The nose cone lock ring 16 and its relationship to the body 21 shown in its cooperative relationship in FIG. 6; the details of which are more fully expanded upon in FIGS. 7 through 10 inclusive. It will be observed in FIG. 10 that the nose cone 15 has four nose cone locking ears 45 which extend radially from its base portion 46. The locking ears 45 abut the interior face of the nose cone lock ring outer collar 48 in the manner as shown in FIG. 6. The auger barrel extension 49 (see FIG. 2) has a nose cone inclined lock 50, the locking face 51 of which is angled at approximately 6° to the plane transverse to the axis of the auger 25. The nose cone locking ring 16, as shown in FIG. 9, has a complementary locking shoulder 52 on an interior lock element 54. Thus, when the nose cone locking ring 16 is ultimately placed in position, as illustrated in FIG. 6, locking takes place between the interface defined between the locking shoulder 52 on the interior of the lock ring 16 and the locking face 51 on the exterior of the auger barrel extension 49. The nose cone locking ears 45 then engage the interior face of the outer collar 48 and the nose cone 15 imperforate curved end portion 35 abuts the nose cone bearing portion 34 of the auger 25. A quarter turn of the locking ring 16 secures the same to the body at the auger barrel extension 49. The limit of turning to lock is defined by the stop shoulder 53.

When the auger 25 is lockingly positioned in place with its guide collar 41 nesting in the guide collar recess 44 and its nose cone bearing portion 34 supported in the nose cone 15, rotation of the handle delivers the ingested foodstuffs into the auger barrel chamber 28. As will be noted in FIG. 7, a plurality of cutting ribs 55 (12 in number) extend for the entire length of the auger barrel chamber 28. In FIG. 6 the relationship of the cutting ribs 55 to the auger barrel chamber 28 and to the helical flights on the auger 25 are shown along the longitudinal area of action.

Also to be noted in FIG. 6 is the interfacial relationship between the nose cone and the nose cone bearing portion 34. The nose cone is tapered at an angle slightly larger than that of the tapered end of the auger so that the actual bearing contact is at the very end portion of the auger in overlapping close frictional fit with the ends of the threads as marked "bearing surface" on FIG. 6. Relief is provided in the end portion of the nose cone for the flattened face of the auger. By providing the journalled support on a radial rather than a longitudinal surface, the two-fold effect of thrust orientation and complete scavenging of the thread ends is achieved. This action is particularly desirable when cutting soft or stringy foods such as parsley or horseradish. In the event the contact is loose as this point, the stringy material will jam and crush. With a clean scavenging action as is provided by the close bearing surface, however, the culmination with a minimum of crushing of such soft and stringy foodstuffs is achieved.

Operation

Returning now to FIG. 1, it will be appreciatd that when the food processor 10 is operated, first, the base lock handle 19 is moved from its normal upward position into the downward position shown in FIG. 1, whereupon the base lock diaphragm 20 firmly attaches the food processor body 21 to the table or other operating base (in a manner to be described in greater detail hereinafter). The foodstuffs to be processed are positioned on the feed tray 22 at the upper portion of the body 21, and then pressed by means of the pusher 14 into the feeder tube 26. Referring now to FIG. 6, it will be seen that the first flight helical screw 29 engages the major portion of the foodstuff ingested through the feed tube 26 and breaks up the very large particles into relatively smaller chunks as the foodstuffs are fed toward the auger barrel chamber 28. The foodstuffs next come in contact with the second helical flight 30 which begins a double lead screw portion. The second helical flight 30 tends to split the original pieces in half. As this action takes place the food particles are tumbled outwardly against the projecting shoulders 56 of the cutting ribs 55.

As the third and fourth helical flights 31, 32 engage the food particles, a further dividing action takes place. Also, the volumetric capacity of the interstitial area defined by the helical flights on the auger 25 and the auger barrel chamber 28 is somewhat diminished. This diminution is offset by increasing the pitch diameter about 25% as the flights progress from the feed tube 26 to the nose cone 15. The interior diameter of the auger barrel chamber 28, of course, is correspondingly sealed to that of the auger 25. In operation it has been found that this diminution in interstitial space, due to the multiple thread, does not effect a crushing action because the particles are being further divided at the time of their progression toward the nose cone 15, and accordingly, require less space. Furthermore, the acceleration due to the increased pitch angle effectively moves the particles faster than they are fed. As a result of the additional helical flights, their relative compaction and forced interaction with the cutting ribs 55 remains relatively constant.

The advantage of the Gothic thread form which is semicircular in nature can be appreciated by deepening any of the thread members of the subject auger. When they are deepened, and soft foodstuffs such as peanuts are processed, it will be noted that extensive clogging will take place in the deepened thread, whereas it will pass readily through the other threads. Similarly, if any of the threads are removed, particularly those beginning at the feed tube portion of the food processor, a wider variety in particle size will result. Large chunks will progress through the threads into the nose cone, and the large chunks that do pass into the nose cone will be crushed rather than shredded or minced, which is the desirable result to achieve.

The material selected for the food processor can increase its efficiency and desirability. For example, the body is made of styrene known as C–11 or more properly, a styrene acrylonitrile. This material resists staining from acids, and also permits dishwashing. The auger construction is desirably made of polypropylene. The handle is made from an acetal resin, preferably that made by the Du Pont Company, known as Delrin. The nose cone is made of .018″ stainless steel.

Referring now to FIG. 12, a diagrammatic indication of the configuration of the exterior portion of the auger 25, it will be observed that there is a feed area, followed by a tumbling area, and at the tapered forward portion a shear area. As was just pointed out, the action which takes place in the initial feed area and the tumbling area is one of comminution and light compaction. In the shear area at the end of the nose cone, the perforate portions of the nose cone, the nose cone itself being quite thin, actually tend to have a scissors effect as the individual particles pass by, and are thus further cut. Were a thick-walled section employed on the nose cone 15, the action would be that of extrusion which is to be avoided. Extrusion results in crushing and mashing of the food particles, and in the example of parsley, it would become moist and sticky. With the illustrative food processor, parsley remains particulate and, therefore, can be sprinkled for garnishing. In an ideal commercial construction, the nose cone perforations are 54 in number with a diameter of about .200″. This gives a total of 1.7 square inches of discharge area. The feed tube diameter in the same construction is approximately 1.5 inches giving a feed tube cross section of 1.77 square inches. Thus, the perforate area in the nose cone is approximately the same as that of the projected area of the feed tube 26. A finely perforated nose cone 15 with an area approximately 10% less than the projected area of the feed tube 26 may be employed, but any lesser perforate area will begin to cause compaction, crushing, and increased operating effort. It will be further observed in FIG. 11, at the end of the nose cone portion there are provided suitable recesses throughout the length of the centrally tapering portion of the auger as it approaches the nose cone bearing portion 34 to permit the foodstuffs to be carried past the nose cone perforations. The imperforate area of the nose cone and the smooth portion of the nose cone bearing portion 34 of the auger 35 are substantially coextensive. Thus, foodstuffs do not become trapped, compressed, or mashed into the bearing surface at the end of the nose cone.

Helical thread development

As was set forth above, an important feature of the present invention relates to the structure which virtually eliminates the compacting and crushing of the foodstuffs which are being processed. It is essential to the present invention that the foodstuffs be steadily removed from the feed tube 26 so that at least the same or more volume of foodstuffs can be transported from the feed tube 26 than can be placed therein. Due to an acceleration of the foodstuffs by an increase in the pitch of the helical flights, any tendency toward compaction is held to an irreducible minimum. In addition to increasing the pitch and thereby accelerating the foodstuffs, multiple threads of a Gothic form are introduced in the auger chamber 28 with a half-round or crescent shaped interstitial helical feed area in order to provide a maximum radial thrust on the food particles commensurate with the acceleration achieved through increasing the pitch. The purpose of this action is to simultaneously tumble the food particles against the cutting ribs 55 while transporting the same toward the nose cone.

To more fully appreciate the physical structure and the relationships between the parts, a few of the dimensions of a successful commercial embodiment will be set forth. Referring to FIG. 12, it will be noted that the guide collar 41 where the helics begin has a diameter designated as $P_1$. This dimension is 1.309″. The maximum pitch diameter designated as $P_2$ is 1.620″. The ratio of the maximum pitch diameter to the minimum pitch diameter is 1.25:1. As to length, $L_1$ is the length designated or assigned to the portion of the screw auger which increases in diameter between $P_1$ and $P_2$ in a successful commercial embodiment is 3.610″. The overall length is 5.245″ leaving a tapered nose cone portion length $L_1$ of 1.635″. The ratio of $L_1$ to $L_2$ approximates 2.2:1.

The intake feed tube 26 has a diameter of approximately 1.500″ leaving a cross-sectional area of approximately 1.77″. The nose cone 15 has approximately 54 perforations or holes each of which is .200″ leaving an approximate projected area of 1.7 square inches. Thus the feed tube opening is very closely identical to that of the nose cone projected area. Considering the fact that large particles of food such as a length of carrot will be pushed into the feed tube 26, and the resulting end product is finely comminuted before departing from the nose cone, adequate insurance is provided as to capacity so that compressing of the processed food or compaction does not occur at the nose cone. For a finer cut, particularly as to dried products such as graham cracker crumbs, or extremely soft products such as tomatoes, the nose cone perforation projected area can be reduced to approximately 10% of the projected area of the feed tube 26, but further reduction will result in jamming, and render the food processor difficult to operate.

It will be further noted that in an ideal construction the second helical flight 30 begins at a diametrically opposed position to the third and fourth helical flights 31, 32. In this manner the work load is balanced. Furthermore, the sinusoidal type wave configuration appearing on the auger shown in FIG. 11 contributes to the twofold advantage of assisting in moldability, but more importantly providing an interrupted acceleration which further augments the tumbling and shearing action of the foodstuff within the auger chamber.

*Base lock*

Figure 17:
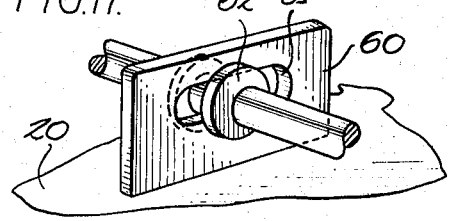
FIG. 17 is an enlarged perspective partially broken view of the crank attachment means shown in the central portion of FIGS. 14, 15 and 16.

The base lock 12 is illustrated in FIGS. 14 through 17. There it will be seen that a base lock diaphragm 20 is provided with a peripheral upstanding diaphragm rim 58 which engages the lower portion of the body 21 of the food processor 20. (See FIG. 16.) The diaphragm 20 is provided with an imbedded actuating plate 59 from which an operating lug 60 extends upwardly. The operating lug 60 is provided with an elongate central slot 61 into which a collar bearing 62 is inserted which flankingly engages the operating lug 60 (FIG. 17). The base lock handle 19 is a single piece element journaled through a base lock handle port 64 in the body 21 and is secured at its opposite terminal end in a base lock recess 65. The offset crank portion of the handle engages the upstanding lug 60, and responsive to a rotation of the handle 19, raises or lowers the central portion of the diaphragm 20 defining a vacuum area therebeneath for securing the same to the flat table surface.

*Handle*

As pointed out above, the unique handle construction is lightweight, susceptible of molding out of plastic, and may be inexpensively and sturdily assembled from but two parts. By virtue of its light weight, and unusual strength, the effort of the operator in rotating the auger 25 of the food processor 10 is substantially reduced. Referring now to FIGURES 18 through 26, it will be seen (see FIG. 18) that the handle 11 has a crank arm body portion 70 which is curved between the hexagonal connecting shaft and handle grip 18. An offset relationship is thereby provided between the driven member D (auger 25) and the handle grip 18. The hexagonal connecting shaft 38 fits within a complementary recess in the driven member D, the bearing portion 40 serving to rotatably journal the same.

As will be noted in FIG. 19, the crank arm 70 tapers between the hexagonal connecting shaft 38 and the handle grip 18. Furthermore, the sidewalls 71 of the crank arm (see FIGS. 22 and 23) taper outwardly to form an isosceles trapezoidal cross-sectional configuration. The back portion 72 of the crank arm connects the two sidewalls 71 and is reinforced internally by the latticed ribbing 75 as best shown in FIG. 20. It will be noted that the latticed ribbing 75 is actually made up of a chain of a plurality of diamond-shaped honeycomb members connected at the point of the diamond most closely adjacent the sidewall 71 by means of wall ribs 78. In this particular embodiment, it has been found that maximum strength commensurate with a minmium employment of material and lightweight may be achieved where the angularity of the diamond members 76 is based upon multiples of 30°. It will be noted that the angle A (again see FIG. 20) is 30°. The adjacent included angle B is 60°. As will be seen in FIG. 21, the wall portions of the latticed ribbing 75 are all parallel with the hexagonal connecting shaft 38 and the handle grip shaft 74. Not only does this arrangement readily facilitate molding, but further compounds the angularity of the latticed ribbing 75 in its relationship between the curved isosceles trapezoidal handle crank arm 70.

Referring now to FIG. 25, it will be seen that a handle grip lock assembly 80 is provided which permits a snap acting lock between the handle grip 18 and the handle grip shaft 74 for spinning rotation of the handle grip 18 on the shaft 74. The locking collar 81 on the interior portion near the end of the handle grip shaft 74 has a forward locking shoulder 84 and an insert bevel 82. The handle grip 18 has a snap plug 85 interiorly thereof at its end which is pushed into and snap-locks interiorly of the shaft 74. The nibs 86 first engage the insert bevel 82 and thereafter are locked in place by the locking shoulder 84. As will be noted in FIG. 26, a spring slot 88 is provided interiorly of the snap plug 85 to accord the resiliency to the nibs 86 and their adjacent collar shaft 89 to permit the snap locking action referred to above. The collar shoulder 90 at the rear portion of the snap plug 85 coacts with the insert bevel 82 to journal the snap plug on the locking collar 81 of the handle grip 18. As will be noted in FIG. 21, a complementary tapered interior relationship is provided between the interior portion of the handle grip 18 and the base of the handle grip shaft 74 so that a crank arm base interface 92 is provided to centeringly journal the handle grip 18.

The particular construction of the snap plug 85 is such that when the handle grip 18 is molded out of a plastic such as Delrin, an acetol resin manufactured by the Du Pont Company, the handle grip 18 can actually be snapped out of the mold in accordance with the ultimate snap action intended for the snap plug 85. Furthermore, the point contact provided between the locking collar 81 and the snap plug 85 in combination with the crank arm base interface reduces the friction between the handle grip 18 and the handle grip shaft 74 to the point where the handle grip 18 may be readily spun about its shaft. This further reduces the friction of the handle grip 18 on the crank arm 70 and provides for ease of operation.

Thus the handle construction not only possesses unusual strength attributable to the latticed ribbing, but may be inexpensively manufactured from two parts, and snap-fittingly assembled for virtually friction-free operation. In a production unit where the center distance between the handle shaft 74 and the hexagonal connecting shaft 38 is 4½″, and the handle grip 18 is slightly over 3″ long, the entire assembly weighs less than two ounces. Despite this lightness of weight an axial distortion by way of torsional force of 20° between the handle grip shaft 74 and the hexagonal connecting shaft 38 is readily tolerated. A further advantage is the provision for ready disassembly of the handle grip 18 from the crank arm 70 in that it admits of ready cleaning and washing thereby rendering the handle quite sanitary for use in kitcen type appliances.

Another desirable advantage achieved by tapering the longitudinal axis of the screw auger and that of the handle is that no separate set screws, locking mechanisms, or the like are required to keep the handle in place. The interfit between the hexagonal member and the interior portion of the auger, in combination with the assist of gravity given by the angled orientation neatly holds the handle in position while operated. Furthermore, the angle assists the operator in obtaining additional comfortable mechanical advantage on the down-stroke as well as the up-stroke of rotation.

Although particular embodiments of the invention have been shown and described in full here, there is no intention to thereby limit the invention to the details of such embodiments. On the contrary, the intention is to cover all modifications, alternatives, embodiments, usages and equivalents of a timer and method as fall within the spirit and scope of the invention, specification and the appended claims.

I claim:

1. A food processor comprising, in combination, a body, a rotatable auger, said auger having a driven end and a tapered nose cone end, an auger chamber within the body adapted to operatively receive the auger, a plurality of longitudinal ribs within the auger chamber in close proximity to the auger, a conical perforated nose cone adapted to close one end of the auger chamber and operatively receive the nose cone end of the auger, a feed tube in the body generally perpendicular to and in open communication with the auger adjacent its driven end said auger chamber having a feed tube end and nose cone end in open communication with said feed tube and nose cone respectively, said auger being characterized by at least one helical flight, said helical flight being of increasing pitch in the auger barrel as the flight progresses from the area of open communication with the feed tube toward the nose cone end of the auger chamber whereby foodstuffs will be accelerated through to the nose cone end of the auger chamber while simultaneously being tumbled against the longitudinal ribs thereby reducing the tendency of the foodstuffs to compress.

2. In the food processor of claim 1, an auger in which the pitch diameter increases from the driven end of the auger to the point where the auger tapers to engage the nose cone, and the auger barrel is frusto-conically proportioned to operatively receive the auger with the longitudinal ribs in close proximity to the helical flight of the auger thereby increasing the auger chamber capacity while accelerating the foodstuffs.

3. In the food processor of claim 2, additional helical flights commencing adjacent the feed tube end of the auger chamber portion of the auger.

4. In the food processor of claim 3, three additional helical flights.

5. In the food processor of claim 4, all said helical flights terminating on the tapered nose cone portion of the auger.

6. In the food processor of claim 1, a half-round Gothic thread form thereby imparting a radial component to the foodstuffs to increase the comminuting action of the longitudinal ribs.

7. In the food processor of claim 4, a thread form in which the thread depth progressively decreases along the auger from the feed tube portion to the tapered nose cone portion.

8. In the food processor of claim 1, support means on the body to secure the same to a flat surface, and support means within the body to orient the auger and auger chamber axis with the auger nose cone portion closer to said flat surface than the driven portion thereby assisting to drain fluids within the auger chamber through the nose cone perforations.

9. In the food processor of claim 1, means journaling the auger in the body at its driven end, means removably locking the perforated nose cone to the nose cone end of the auger chamber, the nose cone having an imperforate end portion, and complementary radial bearing faces on the auger nose cone end and the interior of the nose cone forming a close bearing fit at the thread ends thereby constraining the food particles within the nose cone perforate portion for discharge through the perforations while serving as a self-centering journal for the auger nose cone end.

10. A food processor comprising, in combination, a body, a rotatable auger, said auger having a driven end and a tapered nose cone end, an auger chamber within the body adapted to operatively receive the auger, a plurality of longitudinal ribs within the auger chamber in close proximity to the auger, a conical perforated nose cone adapted to close one end of the auger chamber and operatively receive the nose cone end of the auger, a plurality of locking ears extending radially from said nose cone at its open end portion, a feed tube in the body generally perpendicular to and in open communication with the auger adjacent its driven end, said auger chamber having a feed tube end and nose cone end in open communication with said feed tube and nose cone respectively, said auger being characterized by at least one helical flight, a nose cone locking ring having an outer collar proportioned to overlappingly engage said nose cone locking ears, nose cone ring cammed locking means on the outer portion of the auger chamber, cammed locking means interior of the nose cone ring, all elements proportioned and oriented so that a partial turn of the locking ring will cam its interior camming means against the auger barrel outer camming means and the locking ring outer collar engages the nose cone ears and pulls the nose cone imperforate end into intimate journaled contact with the tapered end portion of the auger.

11. In the food processor of claim 10, a handle having a non-circular extension means defining an extension complementary non-circular recess within the auger driven end to matingly engage said handle prismatic extension.

12. In the food processor of claim 11, a guide collar recess within the body, a guide collar at the driven end of the auger proportioned to nest with the guide collar recess, bushing means in the body in open communication with the guide collar recess and coaxial with the auger chamber, and a circular bearing portion at the base of the handle non-circular extension for journaling the handle while the auger collar and collar recess serve to absorb the thrust of the auger.

13. In the food processor of claim 10, an auger in which the pitch diameter increases from the driven end of the auger to the point where the auger tapers to engage the nose cone, and the auger barrel is frusto-conically proportioned to operatively receive the auger with the longitudinal ribs in close proximity to the helical flight of the auger thereby increasing the auger chamber capacity while accelerating the foodstuffs.

14. In the food processor of claim 10, additional helical flights commencing adjacent the feed tube end of the auger chamber portion of the auger.

15. In the food processor of claim 10, three additional helical flights.

16. In the food processor of claim 10, all of said helical flights terminating on the tapered nose cone portion of the auger.

17. In the food processor of claim 13, a half-round Gothic thread form thereby imparting a radial component to the foodstuffs to increase the comminuting action of the longitudinal ribs.

18. In the food processor of claim 10, support means on the body to secure the same to a flat surface, and support means within the body to orient the auger and auger chamber axis with the auger nose cone portion closer to said flat surface than the driven portion thereby assisting to drain fluids within the auger chamber through the nose cone perforations.

References Cited

UNITED STATES PATENTS

| | | | |
|---|---|---|---|
| 591,323 | 10/1867 | Brown | 146—185 |
| 1,811,740 | 6/1931 | Asbury | 146—185 |

FOREIGN PATENTS

| | | |
|---|---|---|
| 1,370,023 | 7/1964 | France. |

JAMES M. MEISTER, *Primary Examiner.*